F. D. NEWBURY.
CONTROLLING DEVICE.
APPLICATION FILED FEB. 4, 1918.
1,400,092.
Patented Dec. 13, 1921.
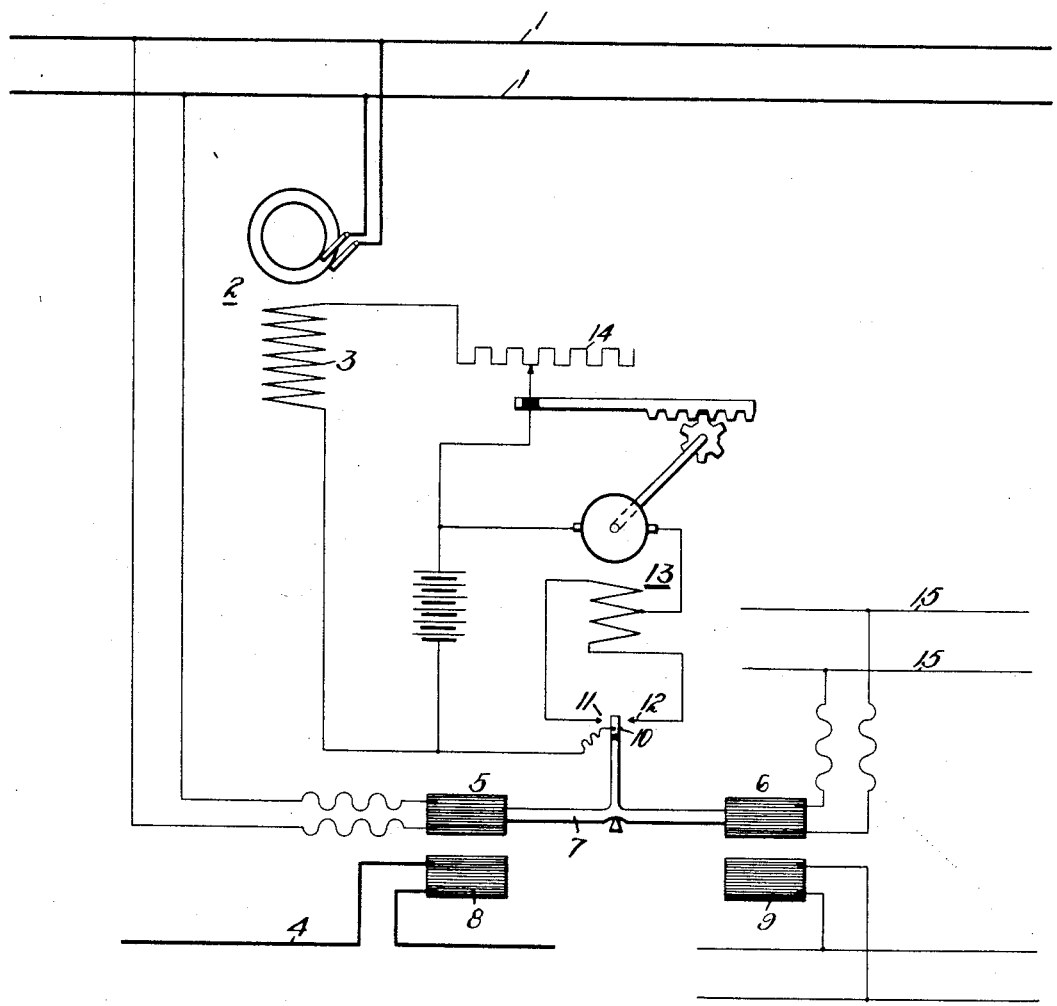
WITNESSES:
INVENTOR
Frank D. Newbury
BY
Wesley G. Carr
ATTORNEY

UNITED STATES PATENT OFFICE.

FRANK D. NEWBURY, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROLLING DEVICE.

1,400,092.           Specification of Letters Patent.      Patented Dec. 13, 1921.

Application filed February 4, 1918. Serial No. 215,403.

*To all whom it may concern:*

Be it known that I, FRANK D. NEWBURY, a citizen of the United States, and a resident of Pittsburgh, in the county of Allegheny and State of Pennsylvania, have invented a new and useful Improvement in Controlling Devices, of which the following is a specification.

My invention relates to controlling devices such, for example, as are employed in the voltage control of distributing systems, and it has for its object to provide apparatus wherewith a controlling force or effect may be produced which shall be proportional to the quotient of two independently variable force or effects.

The single figure of the accompanying drawing is a diagrammatic view of a system embodying my invention.

In the control of electric circuits, many forms of apparatus are known which are suitable for producing a controlling force proportional to the sum, difference or product of two or more independently variable forces or effects but, so far as I am aware, there has as yet been proposed no structure adapted for producing a controlling force proportional to the quotient of two independently variable forces, this type of control frequently being necessitated as, for example, in the control of synchronous booster rotary converters.

By my invention, I develop torque between elements energized in accordance with the current or voltage of the circuit to be controlled, as the case may be, and one of the independently controlling sources. I then provide means for balancing said torque against a torque developed by the action of the remaining controlling force and a constant force. By energizing a field-excitation controlling device or other voltage-controlling means in accordance with the movement of the system produced by said opposing torques, I am enabled to obtain the desired controlling force, as will hereinafter more fully be pointed out.

Referring to the drawing for a more detailed understanding of my invention, I show a distributing system at 1—1, said system being energized from an alternating-current generator 2 having an exciting field winding 3. It is desired that the voltage of the system 1—1 be controlled in accordance with the quotient obtained by dividing the voltage of a controlling circuit 15—15 by the current of an additional controlling circuit 4, both circuits 15—15 and 4 being subject to variation. To this end, I mount coils 5 and 6 on the respective ends of the beam 7 of a balance device like or similar to the well-known Kelvin balance. The coil 5 is connected to be energized in accordance with the voltage of the circuit 1—1 and the coil 6 is connected to be energized in accordance with the voltage of the circuit 15—15. Stationary coils 8 and 9 are located in proximity to the coils 5 and 6, respectively, and connections are provided whereby the coil 8 is energized in accordance with the current in the controlling circuit 4 of the frequency of the system 1—1, and the coil 9 is energized from a suitable source of constant voltage of the frequency of the system 15—15. The beam 7 carries a movable contact member 10 arranged for oscillation between stationary contact members 11 and 12 to energize a suitable motor 13 for rotation in the one or the other direction to adjust a resistor 14 inserted in circuit with the exciting field winding 3 of the alternating-current generator 2.

Having thus described the arrangement of a system embodying my invention, the operation thereof is as follows. By hypothesis, the voltage of the circuit 1—1 should vary directly with the voltage of the circuit 15—15 and inversely with the current of the circuit 4. The connections are, therefore, so established that, upon an increase in the voltage of the circuit 15—15, the attractive force between the coils 6 and 9 is increased, causing the contact members 10 and 12 to engage, whereby the motor 13 is energized to decrease the effective value of the resistor 14, to increase the energization of the field winding 3 and to raise the voltage of the system 1—1. As the voltage of the system 1—1 rises, the energization of the coil 5 is increased until the increased attractive force between the coils 5 and 8 is sufficient to equal that exerted between the coils 6 and 9, whereupon the beam 7 reassumes its horizontal position and the energizing circuit for the motor 13 is opened. For a decrease in the voltage of the circuit 15—15, the converse action takes place.

If it be assumed that the system is in equilibrium and that the current in the circuit 4 is increased, the force of attraction between the coils 5 and 8 is increased, causing the members 10 and 11 to establish contact and thus energize the motor 13 to increase the effective resistance of the resistor 14, whereby the field excitation and voltage of the machine 2 are reduced. This operation continues until the reduced energization of the coil 5, combined with the increased energization of the coil 8, reestablishes the attractive force between the coils 5 and 8 that previously obtained, whereupon the beam 7 again assumes the horizontal position and the motor 13 is stopped. It will be noted that the increase of current in the circuit 4 decreased the voltage of the system 1—1, thus providing the desired reciprocal arrangement to accord with the assumed hypothesis. Conversely, a diminution of the current in the circuit 4 weakens the force of attraction between the coils 5 and 8 and permits the contact member 10 to move to the right, raising the voltage of the system 1—1 until the increased energization of the coil 5 again produces equilibrium in the forces at the two ends of the beam 7.

The above operation may be stated simply and concisely in mathematical terms, as follows:

Voltage (coil 5) x current (coil 8) = K voltage (coil 6) x voltage (coil 9).

The voltage of the coil 9 is assumed constant and we may, therefore, write—

Voltage (coil 5) x current (coil 8) = $K'$ voltage (coil 6).

This may be transformed as follows:

$$\text{Voltage (coil 5)} = K' \frac{\text{voltage (coil 6)}}{\text{current (coil 8)}} = \text{the desired relation.}$$

For purposes of illustration, I have described my system as employed in the control of voltage by the division of a given voltage by a given current, but it is obvious that either voltage or current may be controlled and that either voltage or current may be employed for either the numerator or the denominator of the fraction expressing the controlling force. Furthermore, the coil 9 may be inserted in a constant-current circuit instead of being connected across a constant-voltage circuit and direct current may be employed, rather than alternating, these being obvious modifications.

While I have described my invention in a preferred form, it will be obvious to those skilled in the art that it is susceptible of still other minor changes and modifications without departing from the spirit thereof, and I desire, therefore, that only such limitations shall be placed thereupon as are imposed by the prior art or are specifically set forth in the appended claims.

I claim as my invention:

1. In a system for controlling an electrical quantity in proportion to the quotient obtained by dividing a second electrical quantity by a third electrical quantity, means for developing a force proportional to the product of said controlled quantity and said third quantity, means for developing a force proportional to the product of said second quantity and a fixed magnetic force, means for differentially combining said two forces, and means, operable by the movement of said combining means, for adjusting said controlled quantity.

2. In a system for controlling an electrical quantity in proportion to the quotient obtained by dividing a second electrical quantity by a third electrical quantity, two coils disposed in electromagnetic relation to each other, a third coil disposed in magnetic relation to a magnetic source of fixed strength, means for energizing said first mentioned pair of coils in proportion to the first and third mentioned electrical quantities, respectively, means for energizing said additional coil in proportion to said second electrical quantity, means for differentially combining the force developed between said pair of coils with the force developed between said third coil and said magnetic source, and means, operable by the movement of said combining means, for adjusting said controlled quantity.

3. A system for controlling the voltage of a circuit in proportion to the quotient obtained by dividing a variable voltage by a variable current comprising a moving system carrying two coils, fixed coils mounted adjacent said movably mounted coils, respectively, connections for energizing one of a pair of immediately adjacent coils in proportion to the voltage to be controlled and the other of said coils in proportion to said controlling current, connections for energizing one of the coils of the remaining immediately adjacent set in proportion to said controlling voltage, means for energizing the remaining coil to a fixed amount, said two sets of coils being so disposed that the forces developed therein are in opposition, and means, controlled by the movement of said moving system, for adjusting the voltage in said controlled circuit.

4. The method of indicating the proportionality of a variable force to the quotient of two other variable forces, which consists in producing a controlling force proportional to the product of the first-mentioned variable force and one of the second-mentioned variable forces, and in producing an indicating force proportional to the difference between said controlling force and the other of said second-mentioned variable forces.

5. Apparatus responsive to relations between a variable electrical quantity and the quotient of two other variable electrical quantities, comprising a Kelvin balance having two movable magnets and two fixed magnets mounted adjacent said movable magnets, respectively, means for energizing one of the pair of immediately adjacent magnets in proportion to the first-mentioned electrical quantity and for energizing the other of said magnets in proportion to one of said second-mentioned electrical quantities, and means for energizing one of the other pair of immediately adjacent magnets in proportion to the other of said second-mentioned electrical quantities.

6. Means for indicating the departure of a variable electrical quantity from the condition in which it is directly proportional to a given controlling electrical quantity and at the same time inversely proportional to a second controlling electrical quantity, said means comprising means for developing a force proportional to the product of said variable quantity and said second controlling quantity, means for developing a force proportional to said first-mentioned controlling quantity, and means for differentially combining said forces in such manner as to indicate a balance when said variable quantity has the value desired.

7. A system for controlling the voltage of a circuit in proportion to the quotient obtained by dividing a variable voltage by a variable current, comprising a Kelvin balance device having two movable coils and two fixed coils mounted adjacent said movable coils respectively, connections for energizing one of a pair of immediately adjacent coils in proportion to the voltage to be controlled and for energizing the other of said coils in proportion to said controlling current, connections for energizing one of the coils of the other immediately adjacent set in proportion to said controlling voltage and for constantly energizing the other coil of said set, and means responsive to the movement of said movable coils for adjusting the voltage of said circuit.

In testimony whereof, I have hereunto subscribed my name this 29th day of Jan. 1918.

FRANK D. NEWBURY.